United States Patent
Hoffman et al.

(10) Patent No.: US 9,984,310 B2
(45) Date of Patent: May 29, 2018

(54) SYSTEMS AND METHODS FOR IDENTIFYING SEMANTICALLY AND VISUALLY RELATED CONTENT (71) Applicant: Highspot, Inc., Seattle, WA (US)

(72) Inventors: Raphael Hoffman, Seattle, WA (US); Nate Dire, Seattle, WA (US); Erik Christensen, Shoreline, WA (US); Oliver Sharp, Seattle, WA (US); David Wortendyke, Seattle, WA (US); Scot Gellock, Seattle, WA (US); Robert Wahbe, Seattle, WA (US)

(73) Assignee: Highspot, Inc., Seattle, WA (US)

( * ) Notice: Subject to any disclaimer, the term of this patent is extended or adjusted under 35 U.S.C. 154(b) by 308 days.

(21) Appl. No.: 15/004,693

(22) Filed: Jan. 22, 2016

(65) Prior Publication Data

US 2016/0217343 A1 Jul. 28, 2016

Related U.S. Application Data (60) Provisional application No. 62/107,283, filed on Jan. 23, 2015.

(51) Int. Cl.
*G06K 9/62* (2006.01)
*G06K 9/00* (2006.01)
*G06F 17/27* (2006.01)

(52) U.S. Cl.
CPC ....... *G06K 9/6215* (2013.01); *G06F 17/2785* (2013.01); *G06K 9/00463* (2013.01); *G06K 9/00483* (2013.01); *G06K 9/6218* (2013.01)

(58) Field of Classification Search
CPC .............. G06K 9/6218; G06K 9/6215; G06K 9/00463; G06K 9/00483; G06F 17/2785
See application file for complete search history.

(56) References Cited

U.S. PATENT DOCUMENTS 7,814,425 B1 10/2010 O'Shaugnessy et al.
7,970,721 B2 6/2011 Leskovec et al.
(Continued)

FOREIGN PATENT DOCUMENTS

JP 2012185780 B1 9/2012

OTHER PUBLICATIONS

International Search Report and Written Opinion for International Application No. PCT/US2013/076962, dated Apr. 22, 2014, 11 pages.

(Continued)

*Primary Examiner* — Stephen R Koziol
*Assistant Examiner* — Shaghayegh Azima
(74) *Attorney, Agent, or Firm* — Perkins Coie LLP (57) ABSTRACT

Systems and methods for identifying semantically and/or visually related information among a set of content items, such content items that include similar concepts or that have similar visual aspects, are disclosed. The disclosed techniques provide tools for identifying related information among various content items, such as text pages and documents, presentation slides and slide decks, etc. The disclosed techniques provide improved methods for searching among content items, organizing content items into categories, and pruning redundant content. Furthermore, the disclosed techniques provide improvements to computation of various metrics, including usage, performance, and impact metrics.

23 Claims, 6 Drawing Sheets (56) References Cited

U.S. PATENT DOCUMENTS

| | | |
|---|---|---|
| 8,014,634 B1 | 9/2011 | Chan |
| 8,402,375 B1 | 3/2013 | Skare et al. |
| 8,447,760 B1 | 5/2013 | Tong |
| 8,510,313 B2 | 8/2013 | Vaughan et al. |
| 8,554,601 B1 | 10/2013 | Marsh et al. |
| 8,872,804 B2 | 10/2014 | Cummings et al. |
| 2004/0267700 A1 | 12/2004 | Dumais et al. |
| 2005/0267799 A1 | 12/2005 | Chan et al. |
| 2006/0085427 A1 | 4/2006 | D'Urso |
| 2006/0129538 A1 | 6/2006 | Baader et al. |
| 2006/0248045 A1 | 11/2006 | Toledano et al. |
| 2007/0033517 A1 | 2/2007 | O'Shaughnessy et al. |
| 2007/0079384 A1 | 4/2007 | Grinstein et al. |
| 2007/0088820 A1 | 4/2007 | Kwak et al. |
| 2007/0150515 A1 | 6/2007 | Brave et al. |
| 2008/0154873 A1 | 6/2008 | Redlich et al. |
| 2008/0306954 A1 | 12/2008 | Hornqvist |
| 2009/0019026 A1 | 1/2009 | Valdes-Perez et al. |
| 2009/0106697 A1 | 4/2009 | Ward et al. |
| 2009/0164431 A1 | 6/2009 | Zivkovic et al. |
| 2009/0178144 A1 | 7/2009 | Redlich et al. |
| 2009/0222551 A1* | 9/2009 | Neely ............... G06F 17/30864 709/224 |
| 2010/0070488 A1 | 3/2010 | Sylvain |
| 2010/0082622 A1 | 4/2010 | Irie et al. |
| 2010/0146593 A1 | 6/2010 | Stahl et al. |
| 2010/0198869 A1 | 8/2010 | Kalaboukis et al. |
| 2010/0235351 A1 | 9/2010 | Iwasa et al. |
| 2010/0250556 A1 | 9/2010 | Park et al. |
| 2010/0281389 A1 | 11/2010 | Hutchinson et al. |
| 2011/0023875 A1 | 2/2011 | Dasilva |
| 2011/0107260 A1 | 5/2011 | Park et al. |
| 2011/0191679 A1 | 8/2011 | Lin et al. |
| 2011/0225153 A1* | 9/2011 | Haseyama ........ G06F 17/3002 707/736 |
| 2011/0238754 A1 | 9/2011 | Dasilva et al. |
| 2011/0251875 A1 | 10/2011 | Cosman |
| 2012/0001919 A1 | 1/2012 | Lumer |
| 2012/0066645 A1 | 3/2012 | Laurie et al. |
| 2012/0117475 A1 | 5/2012 | Lee et al. |
| 2012/0131495 A1 | 5/2012 | Goossens et al. |
| 2012/0143859 A1 | 6/2012 | Lymperopoulos et al. |
| 2012/0158751 A1 | 6/2012 | Tseng et al. |
| 2012/0191715 A1 | 7/2012 | Ruffner et al. |
| 2012/0197855 A1 | 8/2012 | Chen et al. |
| 2012/0271819 A1 | 10/2012 | Qiu et al. |
| 2012/0278329 A1 | 11/2012 | Borggaard et al. |
| 2012/0278761 A1 | 11/2012 | John |
| 2012/0290565 A1 | 11/2012 | Wana et al. |
| 2012/0290614 A1 | 11/2012 | Nandakumar et al. |
| 2012/0310926 A1 | 12/2012 | Gannu et al. |
| 2013/0036114 A1 | 2/2013 | Wong et al. |
| 2013/0054583 A1 | 2/2013 | Macklem et al. |
| 2013/0110813 A1 | 5/2013 | Holm et al. |
| 2013/0124653 A1 | 5/2013 | Vick et al. |
| 2013/0218923 A1 | 8/2013 | Kaul et al. |
| 2013/0254280 A1 | 9/2013 | Yang et al. |
| 2013/0268479 A1 | 10/2013 | Andler et al. |
| 2014/0006399 A1 | 1/2014 | Vasudevan et al. |
| 2014/0089048 A1 | 3/2014 | Bruich et al. |
| 2014/0089402 A1 | 3/2014 | Liyanage et al. |
| 2014/0189516 A1 | 7/2014 | Guo et al. |
| 2014/0359424 A1 | 12/2014 | Lin et al. |
| 2015/0177933 A1 | 6/2015 | Cueto |
| 2016/0042253 A1* | 2/2016 | Sawhney ............ G06K 9/6255 382/190 |
| 2016/0162591 A1 | 6/2016 | Dokania et al. |

OTHER PUBLICATIONS

International Search Report and Written Opinion for International Application No. PCT/US2014/029505, dated Jul. 7, 2014, 11 pages.
Screenshot of Frequently Asked Questions page of Speaker Deck website. Taken Dec. 10, 2014 https://speakerdeck.com/faq#file_types.
Screenshot of main page of Speaker Deck website. Taken Dec. 12, 2014 https://speakerdeck.com/.

* cited by examiner

| Slide Family | # | Usage | | | Customer Engagement | | | | Business Impact | | | | |
|---|---|---|---|---|---|---|---|---|---|---|---|---|---|
| | | Views | Bulk Mails | Pitches | Customer Views | Dwell Time | Open Rate | MQLs Influenced | Won Deals Influenced | Revenue Influenced | Conversion Velocity Uplift | Conversion Rate Uplift |
| [image] | 6 | 232 | 1090 | 52 | 44 | 117 min | 44% | 44 | 12 | $2.4 million | 18% | 5% |
| [image] | 4 | 155 | 543 | 66 | 32 | 109 min | 29% | 21 | 6 | $0.9 million | 6% | 1% |

SYSTEMS AND METHODS FOR IDENTIFYING SEMANTICALLY AND VISUALLY RELATED CONTENT

RELATED APPLICATIONS

This application claims the benefit of U.S. Provisional Patent Application No. 62/107,283 filed Jan. 23, 2015, entitled SYSTEMS AND METHODS FOR IDENTIFYING SEMANTICALLY AND VISUALLY RELATED CONTENT, which is herein incorporated by reference in its entirety. This application is related to U.S. patent application Ser. No. 14/566,515 filed Dec. 10, 2014, entitled SKIM PREVIEW, U.S. Provisional Patent Application No. 61/914,266 filed Dec. 10, 2013, entitled SKIM PREVIEW, U.S. Provisional Patent Application No. 61/745,365 filed Dec. 21, 2012, entitled INTEREST GRAPH-POWERED SEARCH, U.S. Non-provisional patent application Ser. No. 14/136,322, filed Dec. 20, 2013, entitled INTEREST GRAPH-POWERED SEARCH, U.S. Provisional Patent Application No. 61/800,042 filed Mar. 15, 2013, entitled INTEREST GRAPH-POWERED FEED, U.S. Non-provisional patent application Ser. No. 14/214,140, filed Mar. 14, 2014, entitled INTEREST GRAPH-POWERED FEED, U.S. Provisional Patent Application No. 61/800,322, filed Mar. 15, 2013, entitled INTEREST GRAPH-POWERED BROWSING, U.S. Non-provisional application Ser. No. 14/213,505 filed Mar. 14, 2014, entitled INTEREST GRAPH-POWERED BROWSING, U.S. Provisional Patent Application No. 61/800,497 filed Mar. 15, 2013, entitled INTEREST GRAPH-POWERED SHARING, U.S. Non-provisional patent application Ser. No. 14/213,983 filed Mar. 14, 2014, entitled INTEREST GRAPH-POWERED SHARING, and U.S. Provisional Patent Application No. 62/037,956 filed Aug. 15, 2014, entitled FEED, all of which are herein incorporated by reference in their entireties.

BACKGROUND

Businesses, government entities, groups of people, and other types of organizations are capable of generating massive amounts of content on a daily basis. Furthermore, this content can easily be copied, modified, shared, and republished in different contents nearly as quickly. For example, documents may be edited, slides of a presentation deck may be re-arranged, a slide from one presentation deck may be re-used in other presentation decks, and so on. When one portion of content (e.g., a slide or page) is copied from one content item (e.g., a presentation deck or word processing document) to another, it is not considered the same portion of content by document management systems. Furthermore, when these content elements are edited, other aspects of the content element may remain unchanged and, therefore, the pre- and post-edited elements may remain semantically and/or visually similar. However, document management systems track usage and other statistics related to the two copies separately even though they contain the same information. Keeping separate metrics for these two portions of content dilutes the quality of metrics, which can be made even worse each time the content is copied or a new version is created.

DETAILED DESCRIPTION

Systems and methods for identifying semantically and/or visually related information, such as content items that include similar concepts or that have similar visual aspects, are disclosed. The disclosed techniques provide tools for identifying related information among various content items, such as text pages and documents, presentation slides and decks, and so on. The disclosed techniques provide improved methods for searching among content items, organizing content items into categories, pruning redundant content, and so on. Furthermore, the disclosed techniques provide improvements to the computation of various metrics, including usage, performance, and impact metrics.

In some embodiments, the disclosed system is part of a content management service system that allows users to add and organize files, including presentation decks, word processing documents, images, and so on. The content can be provided to the content management service system in any number of ways, such as uploaded from a computer, imported from cloud file systems, added via links (e.g., a URL to a location on a remote server or storage system), and so on. The content management service system provides the ability to search, browse for related content, organize the content into categories, prune redundant content, and so on.

In some embodiments, the disclosed techniques allow content to be selected and provided or made available to customers who can then engage with the content. The content management service system measures this engagement through a variety of metrics and uses these metrics to drive usage, performance, and impact analytics:

Usage analytics measure the degree to which slides were provided or made available to and viewed by customers. One example usage metric is the number of times a content item was pitched to customers.

Performance analytics measure the degree to which customers have engaged with (e.g., read, edited, shared, saved) the pitched content. Metrics include the dwell time on an item, such as the amount of time that the content was displayed in a content viewer (e.g., web browser or other application) as obtained by, for example, a web analytics tracker.

Impact analytics tie the content to business metrics. For example, one business metric is the average revenue per pitch of a content item. Some business metrics can be obtained from other systems, such as customer relationship management (CRM) systems, marketing automation systems, and so on.

In some embodiments, the content management service system generates these metrics for each content item. When users search for content or browse related content, they can also investigate these metrics.

In some embodiments, the disclosed techniques enable searching and browsing related content, and investigating metrics can be enabled on various levels of granularity, such as corpus level, document level, slide level in the case of presentation slides, page level for documents, chapter level for books, section level for periodicals, and so on. Enabling these operations on varying levels of granularity is particularly important within organizations due to how content evolves over time: documents may be edited, slides of a presentation deck may be re-arranged, and a slide from one presentation deck may be re-used in other presentation decks. Furthermore, when content is copied, it may be modified slightly by the user or automatically modified by software based on, for example, a "theme" being used. For example, when a slide from one presentation deck is copied from one presentation deck to another, the slide may be modified based on a color scheme in the new or target slide even though the substantive content of the slide does not change. Furthermore, different users may, independently from each other, create semantically similar content items. While individual slides may be very similar, the containing presentation decks may be different.

In some embodiments, the content management service system uses the analytic techniques described herein to identify when content, slides, slide decks, or groups thereof are variations on one another based on semantic and/or visual similarities. The system can present the variations of semantically and visually related content items grouped together. Furthermore, the content management service system can show usage, performance, and impact metrics with the content, thus making users aware not only of the existence of related content but also, for example, the degree of customer engagement with these variations (individually and/or collectively). When the similarity measurement between two different content items exceeds a predetermined threshold, keeping metrics separate may dilute the quality of the metrics. In such cases, the metrics can be aggregated over clusters of similar content.

The disclosed system and methods include components for:
  Applying these techniques within a business or other kind of organization where the users have shared goals and a shared body of content.
  Finding exact duplicates of slides or pages (from potentially different decks or documents) and collapsing them for an enhanced browsing experience.
  Identifying slides or pages similar to a given query slide or page, and decks or documents similar to a given query deck or document. This is useful when a user has already found a relevant slide or deck (or page or document) and is interested in exploring semantically and visually similar variations.
  Creating clusters over all slides or decks (or pages, documents, etc.). There may be many sets of slides or decks (or pages, documents, etc.) that are semantically and/or visually very similar.
  Applying analysis to a wide range of features extracted from presentation decks. Presentations can be stored in a variety of formats, including PPTX (MICROSOFT POWERPOINT) and PDF (PORTABLE DOCUMENT FORMAT). They may contain text at various font sizes, embedded images, and other embedded objects. Any or all these features can be used to determine similarity.
  Assisting users in organizing their content into categories by displaying semantically and visually similar content.
  Assisting users in pruning redundant content by displaying semantically and visually similar content.
  Generating reports of usage, performance, and usage analytics of content, and aggregating these metrics over clusters of similar content items.

User Experience

Viewing Slides Similar to a Query Slide

In some embodiments, the system applies the disclosed techniques to help users of a content management service system find variations of a given presentation slide (i.e., a query presentation slide), a given presentation slide deck (i.e., query deck), or other form of content (i.e., query content).

Figure 1:
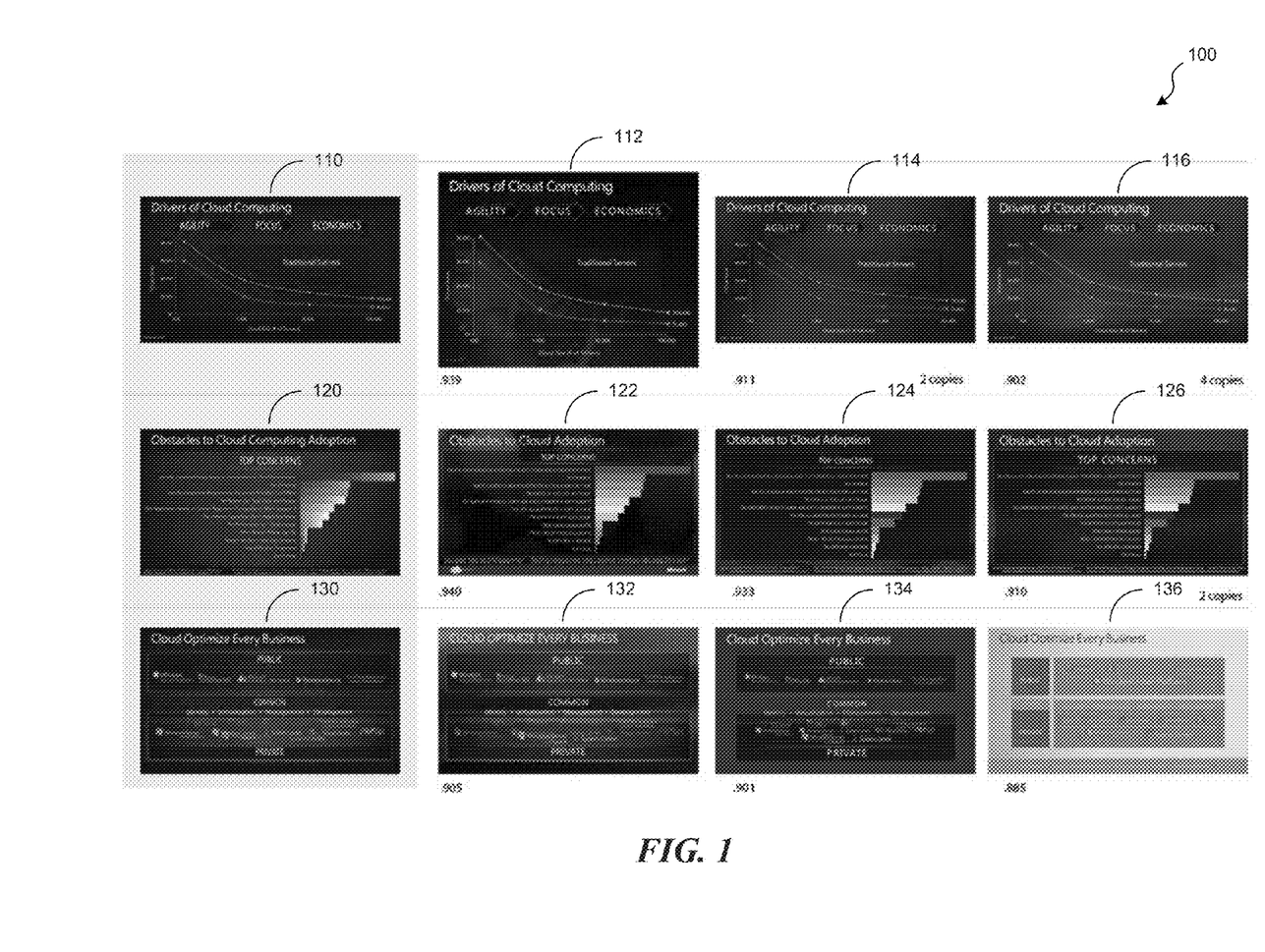
FIG. 1 is a display page showing how, for a given set of presentation slides (left column), semantically and/or visually similar slides are shown (to the right) in some embodiments of the disclosed technology.

FIG. 1 is a display page 100 illustrating how, for a given set of presentation slides 110, 120, and 130, semantically and/or visually similar slides 112-116, 122-126, and 132-136 are presented. To the right of each given slide, similar slides are shown in order of decreasing similarity. The value under each slide is a similarity measurement, ranging between 0 (meaning no measured similarity) to 1 (meaning identical). As can be seen, the system is able to determine that slides have a high degree of similarity, even when 1) there are different text shades and/or fonts and 2) diagrams and/or backgrounds have been modified. In this example, near duplicate slides (i.e., slides whose similarity measure exceeds a predetermined threshold (e.g., 0.5, 0.75, 0.95, 0.999) determined by a user or automatically) are grouped and only one copy is displayed.

It is not uncommon that an exact copy of a slide is used in multiple slide decks. To enhance the browsing experience, duplicate slides are grouped and only one copy is shown. In this example, for slides with exact duplicates, the number of duplicates is shown below it. Similarly, the disclosed techniques can be applied to other forms of media, such as books, periodicals, etc.

Viewing Decks Similar to a Query Deck

In some embodiments, the disclosed system applies these techniques to find variations of a given presentation deck. While the user experience is the same as in the case of slides, each content item in the interface represents a deck, and similarities are computed considering the entire content of the deck.

Viewing Clusters of Similar Slides

In some embodiments, the system applies these techniques to a content management service system to create a clustering over all slides based on calculated similarity measurements. Such a global clustering can enhance a user's browsing experience, as similar slides can be grouped together.

Figure 2:
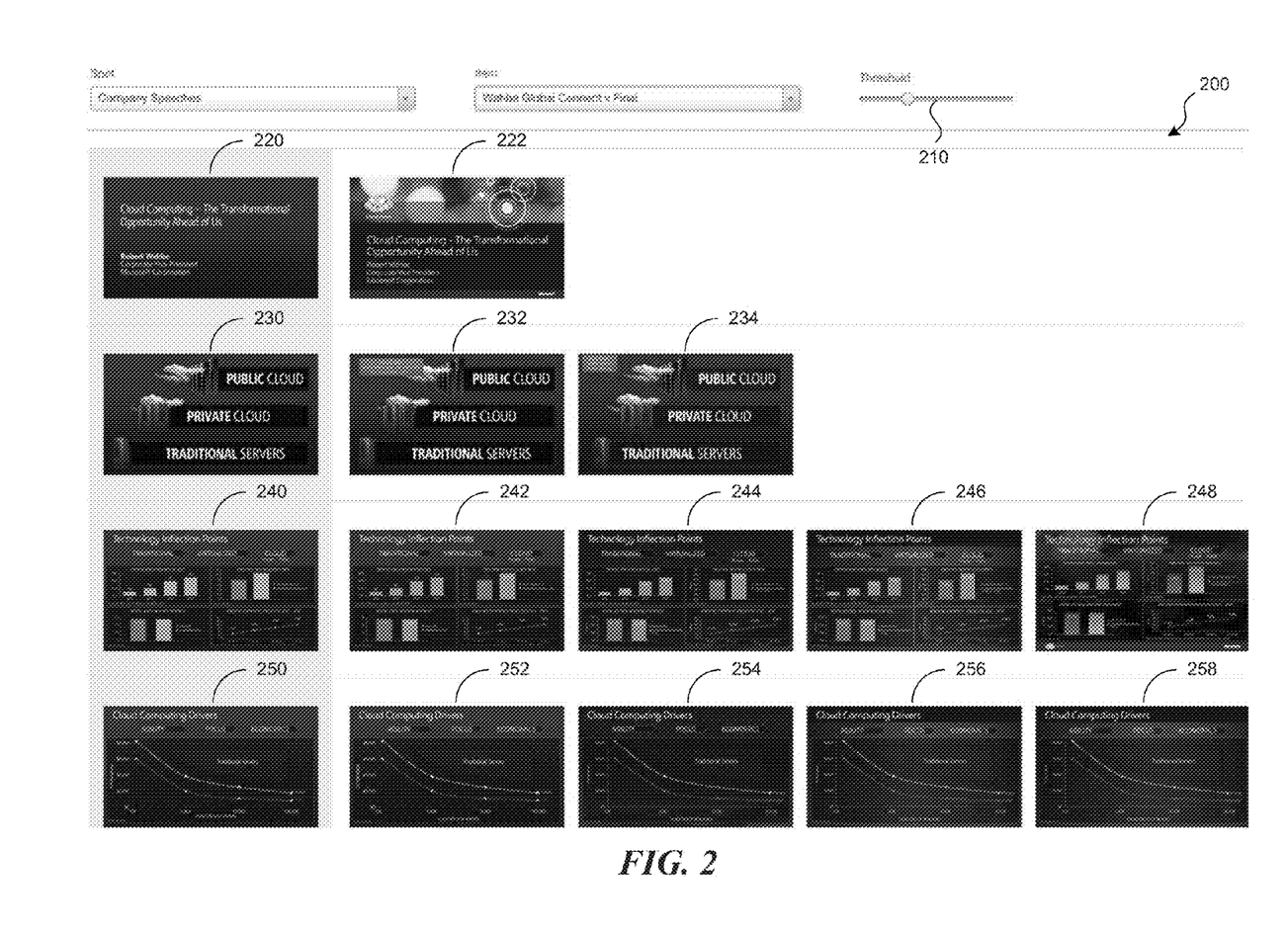
FIG. 2 is a display page illustrating a tool to generate and explore global clusters of presentation slides in accordance with some examples of the disclosed technology.

FIG. 2 is a display page 200 illustrating a tool for exploring clusters over all slides at various similarity thresholds. A user can move the slider 210 at the top of the page to adjust a similarity threshold used to decide whether two clusters should be merged (i.e., adjusting the similarity threshold). The system may refresh the clustering view in real-time. In this example, each of slides 220, 230, 240, and 250 are shown on the left end of a row of semantically and/or visually similar slides 222, 232-234, 242-248, and 252-258 based on the threshold value selected via slider 210. In this case, although the slides in each row have differences, they have still been determined to be visually and/or semantically similar based on various attributes of these slides, such as color, font, text, formatting, layout, etc. Sliding the slider to increase the threshold value may cause the system to generate a new row for one or more slides that no longer satisfy the threshold. Conversely, decreasing the threshold value may case the system to collapse one or more rows into each other.

This view lets users quickly explore which slides have many variations. The system can also aggregate usage, performance, and impact metrics over each cluster, and re-order the clusters accordingly. This allows users to easily identify clusters of semantically and visually similar slides, which taken together have high customer engagement.

Viewing Clusters of Similar Decks

In some embodiments, the system applies the disclosed techniques to create clusters over presentation decks. Again, the user experience is the same as in the case of slides, but similarities are computed using the entire content of the decks.

Viewing Performance of Slide Clusters

Figure 3:
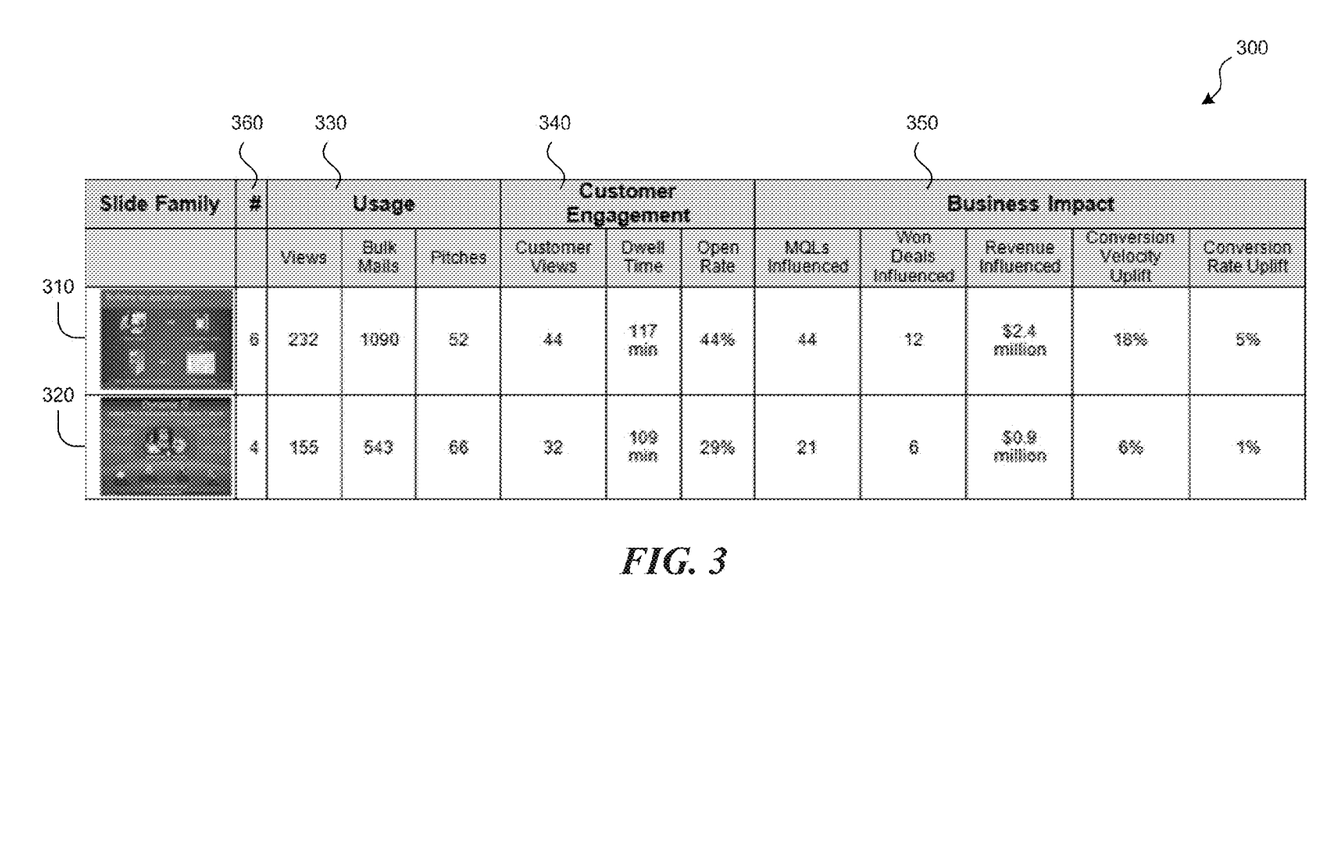
FIG. 3 is a display page showing a report representative of the performance of a set of slides, grouped together into "families" in accordance with some examples of the disclosed technology.

In some embodiments, the system applies the disclosed techniques to create a report of performance of clusters of slides. FIG. 3 is a display page 300 showing a report representative of the performance of a set of slides, grouped together into "families." In this example, each row represents one cluster of similar slides, called a "Slide Family," with the most commonly used slide one shown as a thumbnail. For example, the system may capture an image of the most commonly used slide and resize the captured image to generate a thumbnail. In this example, the report indicates the number 360 of slides in the family, and then shows measures of usage 330, performance or customer engagement 340, and business impact 350 for the corresponding family of slides.

In this example, usage 330 measures how much activity inside the organization was associated with this slide family (e.g., how many times slides of the slide family were viewed, how many times decks of a slide family were sent out containing a slide of the slide family in a bulk mailing to potential or actual customers, how many times a slide of a slide family was part of a deck that was pitched to one or more customers directly by a salesperson). There are other measures of usage that could be tracked, such as the amount of time internal users interacted with slides of a slide family or decks of a deck family (sometimes known as "dwell time"), the number of times they copied or downloaded slides of a slide family or decks of a deck family, the number of comments they left about slides of a slide family or decks of a deck family, and the like.

Customer engagement 340 measures how much activity customers engaged in when sent a pointer to decks containing this slide family. In this example, three such measures are shown: 1) how often the customer viewed members of the slide family, 2) how much time they spent looking at members of the slide family ("dwell time"), and 3) how often they opened members of the slide family when a member of the slide family was sent to them ("open rate"). Other measures could be tracked, such as the amount of time it took for them to react after a member of the slide family was sent, the number of times a customer requested to be unsubscribed from a mailing list when an email containing a member of the slide family was sent, etc.

Business impact 350 measures how much a particular slide or family of slides have impacted business measures. In this example, there are five business impact metrics shown: 1) the number of marketing qualified leads (MQLs) that were influenced by having seen members of the slide family, 2) the number of successful deals that were influenced, 3) the amount of revenue those deals generated, 4) the increase in speed of conversion between sales stages when members of the slide family were sent, and 5) the increase in the rate of conversion when this piece of content was sent. Many other business metrics could be tracked, such as the conversion rate and velocity of the sales stage the deal was in, the number of sales qualified leads (SQLs) that were influenced, and so forth.

In some embodiments, the system comprises:

An ingestion system that analyzes new content, splitting presentation decks into individual slides, and extracting a variety of information that is useful for later determining the similarity of slides as well as decks.

A similarity analysis system that uses this information to compute similarity scores of pairs of content items, as well as global clusters of all content items. These clusters allow for the aggregation of metrics from individual items to their clusters.

Ingestion System

In some embodiments, the system processes new content as it is added or otherwise made available to the system. In some cases, presentation decks can be automatically detected and analyzed separately. Each deck can be split into individual slides, and a variety of semantic and visual information is extracted.

Presentation decks and other documents can be stored in a variety of formats. For example, MICROSOFT POWERPOINT'S PPTX and PPT formats are common but so is ADOBE's PDF format, which is often used to share documents that may have been created using a wide range of software applications, MICROSOFT'S DOC format, and so on. Formats such as PDF, however, are also frequently used for documents that do not contain presentation slides. In such cases, the system may automatically determine if the document is likely to contain presentation slides, based on properties such as aspect ratio or other visual characteristics. It is also possible to take into account other signals, such as formatting and content.

In some embodiments, the system parses each document, determines individual slides, and extracts information from these slides. This processing can be performed separately for each document format. While it is possible to convert documents in formats such as PPTX and PPT to PDF and engineer an ingestion process only for the latter, this approach can lead to lower quality results as some information is only available in the source documents. The system may also use a hybrid approach in which each presentation deck is converted to PDF, and then both PDF and, where available, PPT and PPTX, can be used to extract information.

The following types of information can be extracted:
A thumbnail image showing a rendering of the slide.
For each embedded image, the binary representation of the image.
The text appearing on the slide and/or snippets thereof.
Formatting information including font sizes.
PowerPoint tags indicating text snippets representing title, subtitle, slide numbers, headers, and footers.

Some of that information is likely to represent a better semantic or visual summary of the slide or deck than other information. For example, a word appearing in the title may be more relevant than a word appearing in the footer. The system therefore computes a set of relevant semantic and visual features from this information including, for example, titles, footers, text related to diagrams or images, text within a table, text in the foreground and/or background, and so on. Some features are marked with a boost, indicating that it should be given more or less weight. For example, words and snippets with font sizes larger than average or marked as title can be boosted (e.g., 3×) and words in the footer can be reduced (e.g., 0.5×). These boosts can be set manually or trained based on manual feedback about slides being similar or not.

Features may include exact snippets of text as well as tokens such as words contained in these snippets. Tokens can be obtained using Apache's Lucene or another tokenizer.

It is common for users to re-use images when creating slides. For example, icons, company logos, charts, and diagrams are frequently copied because it is not easy or necessary to re-create them. In some embodiments, the system takes into account such image re-use by including hashes of the embedded images as features so that each images does not have to be analyzed visually each time.

In many cases, users re-use entire slides in different presentation decks. Such duplicates can have a negative impact on the user experience when a user searches for variations of a given slide but needs to find these variations among a large number of duplicates. The system therefore may detect duplicates by computing a hash on the slide thumbnail and comparing this hash to hashes computed for other slide thumbnails.

Similarity Analysis System

The system periodically (e.g., once per minute, hour, day, week, month) invokes a process that computes the similarity between slides and decks, and stores each item's nearest neighbors (e.g., the top five most similar slides or decks) as well as clusters of items.

Similarity

To find similar content items, a similarity function over items is defined. In some examples, similarity function(s) may be generated by presenting content items of a training set of content items to one or more users and receiving similarity scores from the users based on a) the similarity of content elements and/or b) regions of content elements and performing a regression analysis of the produced similarity scores. In some examples, the component may apply functions that measure quantifiable differences between content items or content elements, such as the number of words, the number of matching words, pixel color values, width and/or height dimensions, font size, or some combination thereof. Using these values, a similarity score between two content items, content elements, or regions of a content element (A and B) can be determined by calculating the distance between these attributes according to the following equation:

$$\sqrt{\sum_{i=0}^{n}(A_i-B_i)^2}$$

where $A_i$ represents the $i^{th}$ attribute value for A, $B_i$ represents the $i^{th}$ attribute value for B, and n represents a number of attributes. Each item is represented by its features, which have been extracted during ingestion. Many similarity functions are possible; one approach is to first apply a TF/IDF (term frequency-inverse document frequency) weighting on features, and then use the cosine similarity function. An alternative would be to use the inverse Euclidean distance over the feature vectors. Note that some features may have been marked with a boost, as described above. In this case, the weights to account for these boosts.

With this definition of similarity, the nearest neighbors above a certain threshold are computed for each item. References to the nearest neighbors are stored with each item for later retrieval.

Clusters

The item similarity function defined above can also be used to induce a clustering over all items. Many clustering algorithms can be used here; a simple and efficient approach is hierarchical agglomerative clustering, for example with the single-linkage, or average linkage criterion. While the latter is computationally more expensive, it may yield more balanced cluster sizes and higher accuracy. An alternative way to compute the clusters is to use a technique like k-means clustering, which iteratively assigns data points to a cluster centroid and moves the centroids to better fit the data. One of ordinary skill in the art will recognize that other clustering methods may be employed.

A termination criterion determines when the clustering algorithm stops. One such criterion is a threshold on the similarity function defined above. In some embodiments, the clustering method computes many clusters at different similarity thresholds and stores indications of these clusters, which can later be used to aggregate performance metrics and enable the interactive user experience with a slider depicted in FIG. 2.

Figure 4:
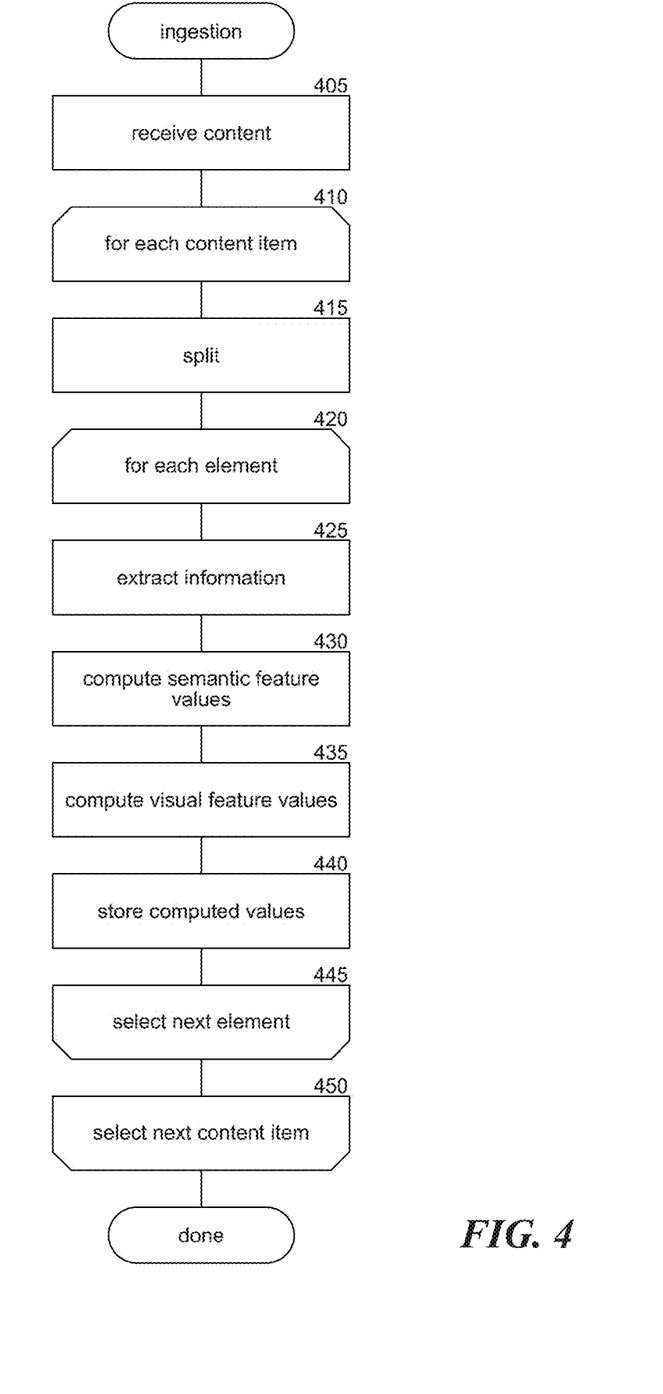
FIG. 4 is a flow diagram illustrating the processing of an ingestion component in accordance with some examples of the disclosed technology.

FIG. 4 is a flow diagram illustrating the processing of an ingestion component in accordance with some examples of the disclosed technology. In block 405, the component receives content, such as content submitted by users, content retrieved using links, Uniform Resource Locators, etc. In some cases, the component may retrieve a set of content items based on a received list of files or directories. In blocks 410-450, the component loops through each of the received content items to process each for ingestion into the system. In block 415, the component splits the current content item into "content elements," if the component is comprised of more than one content element, by, for example, identifying breaks or boundaries between each content element. For example, if the content item is a presentation deck, then the component can split the content item into slides. As another example, if the content item is a word processing document, then the component can split the content item into pages. In blocks 420-445, the component loops through each of the content elements for the currently selected content item to analyze and identify semantic and/or visual features of the content element. In block 425, the component extracts information from the content element, such as text, tokens, graphics, formatting, etc. In block 430, the component determines semantic feature values for the content element based on the extracted information. For example, the component may apply latent semantic analysis techniques to extracted text. In block 435, the component determines visual feature values for the content element based on the extracted information. For example, the component may generate a thumbnail of the content element, identify the most common color or colors or font used in the content element, and so on. In some cases, various features may be weighted differently. For example, larger text (bigger font) may be weighted more heavily than smaller text. As another example, text with a high contrast compared to the background may be weighted more heavily than text that is similar in color to the background (e.g., by comparing RGB, HSV, and/or intensity values of the pixels corresponding to text to the RGB, HSV, and/or intensity values adjacent pixels). In block 440, the component stores the computed values (in accordance with their weights). In block 445, the component selects the next content element of the currently selected content item and loops back to block 425, if there are any remaining; if not, the component continues at block 450. In block 450, the component selects the next content item and loops back to block 415, if there are any remaining;

if not, the component completes. In some embodiments, a means for ingesting content comprises one or more computers or processors configured to carry out an algorithm disclosed in FIG. 4 and this paragraph.

Figure 5:
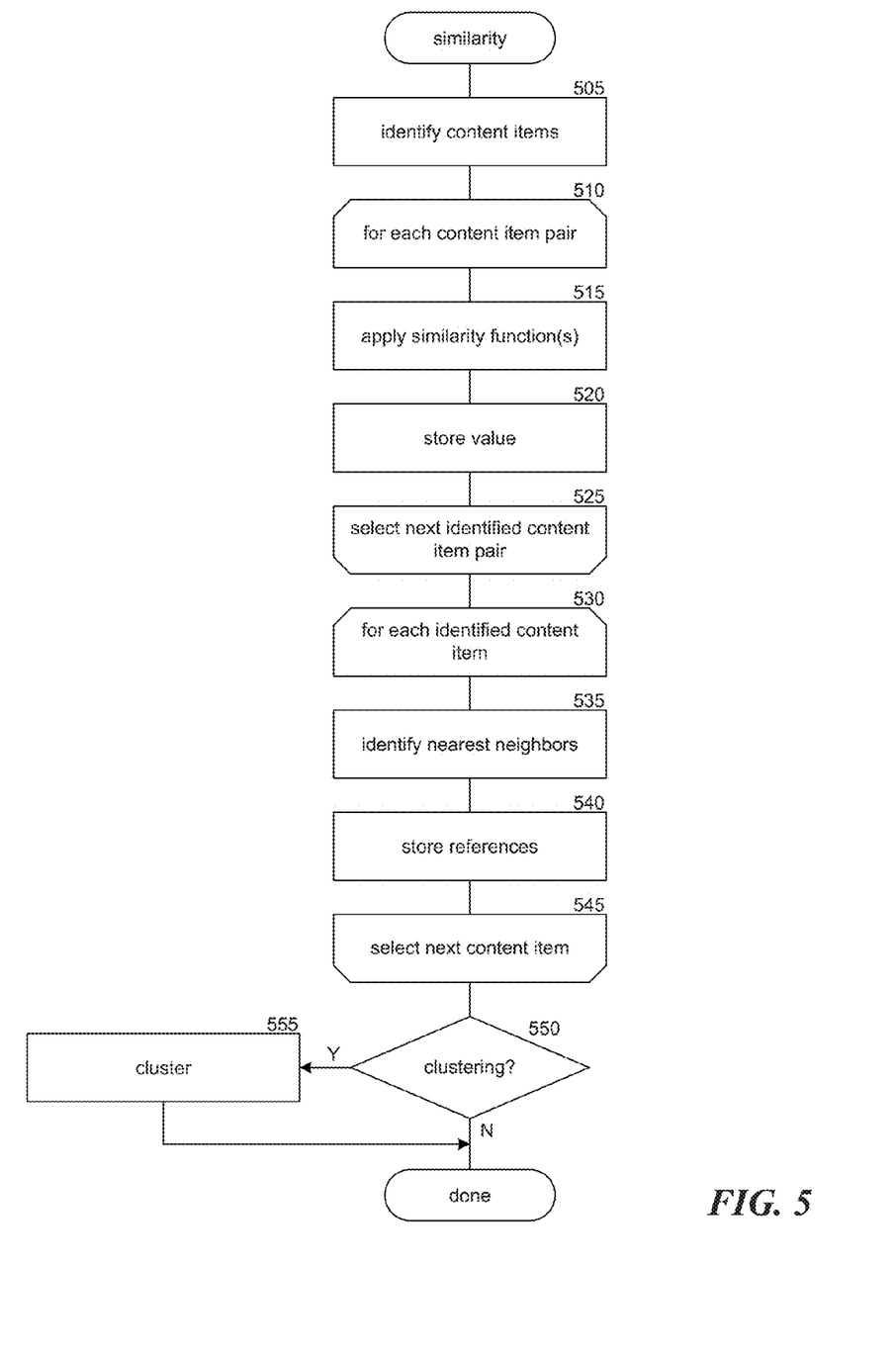
FIG. 5 is a flow diagram illustrating the processing of a similarity component in accordance with some examples of the disclosed technology.

FIG. 5 is a flow diagram illustrating the processing of a similarity component in accordance with some examples of the disclosed technology. In block 505, the component identifies the content items for which similarity measures are to be generated. For example, the component may receive a list of content items or a directory or set of directories to process. In blocks 510-525, the component loops through each pair of identified content items to generate a similarity measure for the pair. In block 515, the component applies one or more similarity functions to the stored semantic and/or visual features determined for each content item to generate one or more similarity values. For example, the component may identify a feature found in both content items, such as a table or graph and compare features of both, such as text stored therein, colors, etc. In block 520, the component stores the similarity value(s) in association with each content item of the pair. For example, the component may store the values as metadata for each content item, in a separate database, lookup table, or other data structure, and so on. In block 525, the component selects the next content item pair and loops back to block 515, if there are any remaining; if not, the component continues at block 530. In blocks 530-545, the component loops through each of the identified content items to identify, for each, the most similar content items. In block 535, the component identifies the nearest neighbors (i.e., most similar content items) using the similarity values for the currently selected content item (each similarity value for the currently selected content item representing the similarity between the currently selected content item and a different content item (i.e., a content item pair)). For example, the component may identify a predetermined number of similar content items, such as the top 3, top 5, top 10, or top 50 most similar content items. As another example, the component may identify all content items for which a similarity value that exceeds a predetermined threshold (e.g., 0.1, 0.6. 0.8, 0.95) was calculated. In some cases, the component may apply a combination of these techniques. In block 540, the component stores references to the identified neighbors in association with the currently selected content item, such as in metadata of the currently selected item, in a database, lookup table, or other data structure, and so on. In block 545, the component selects the next content item and loops back to block 535, if there are any remaining; if not, the component continues at block 550. In decision block 550, if the component is configured to perform clustering, then the component invokes a clustering component at block 555 that applies one or more clustering algorithms to the identified content items, else the component completes. In some embodiments, a means for assessing similarity of content items comprises one or more computers or processors configured to carry out an algorithm disclosed in FIG. 5 and this paragraph.

Elaborations

To accurately compute semantic similarity, extracting all text contained in a slide is important, but not all text can be easily obtained. In some cases, text is contained in embedded images. In such cases, an optical character recognition (OCR) algorithm can be applied to extract the text.

One challenge is that the embedded images of a slide or page have different purposes. Some are diagrams with important content, some are company logos, and some are background themes, and so on. Without treating such embedded images separately, it is difficult to define features and boosts that only surface semantically related content. This problem can be addressed by determining the function of an embedded image using properties such as if the image is contained in the slide template.

In some embodiments, the system uses visual features on the slide renderings and embedded images, such as features based on colors or scale-invariant feature transform (SIFT). This approach increases recall, allowing the system to find more similarities between slides, but, when applied to slide renderings, may favor purely visual over semantic similarity.

One potential challenge is that slides tend to contain only small amounts of text. Two slides may thus be semantically very similar, and nonetheless share few features in common. To enable the system to discover such semantically similar slides or decks, one can apply a dimensionality reduction technique, such as latent semantic analysis (LSA). Each slide can then be represented with a smaller number of features (a few hundred or thousand). This reduced dimensionality also makes it possible to efficiently search for nearest neighbors, for example, using a KD-tree index.

To compute measurements such as usage, performance or customer engagement, and business impact (as shown in FIG. 3), data may need to be imported from other systems. In this example, the data may be stored in a marketing automation system, which is commonly used to send email to many actual and potential customers, measuring their level of interest and scoring how likely they will be to purchase the product. Data about the deals in which the content is involved may be stored in a sales automation system, also known as a customer relationship management (CRM) system. Other measures of content performance might come from a learning management system or other business application. The system may need to pull data from a variety of data sources in order to provide a complete picture of the performance of the content for its intended use within the organization.

Figure 6:
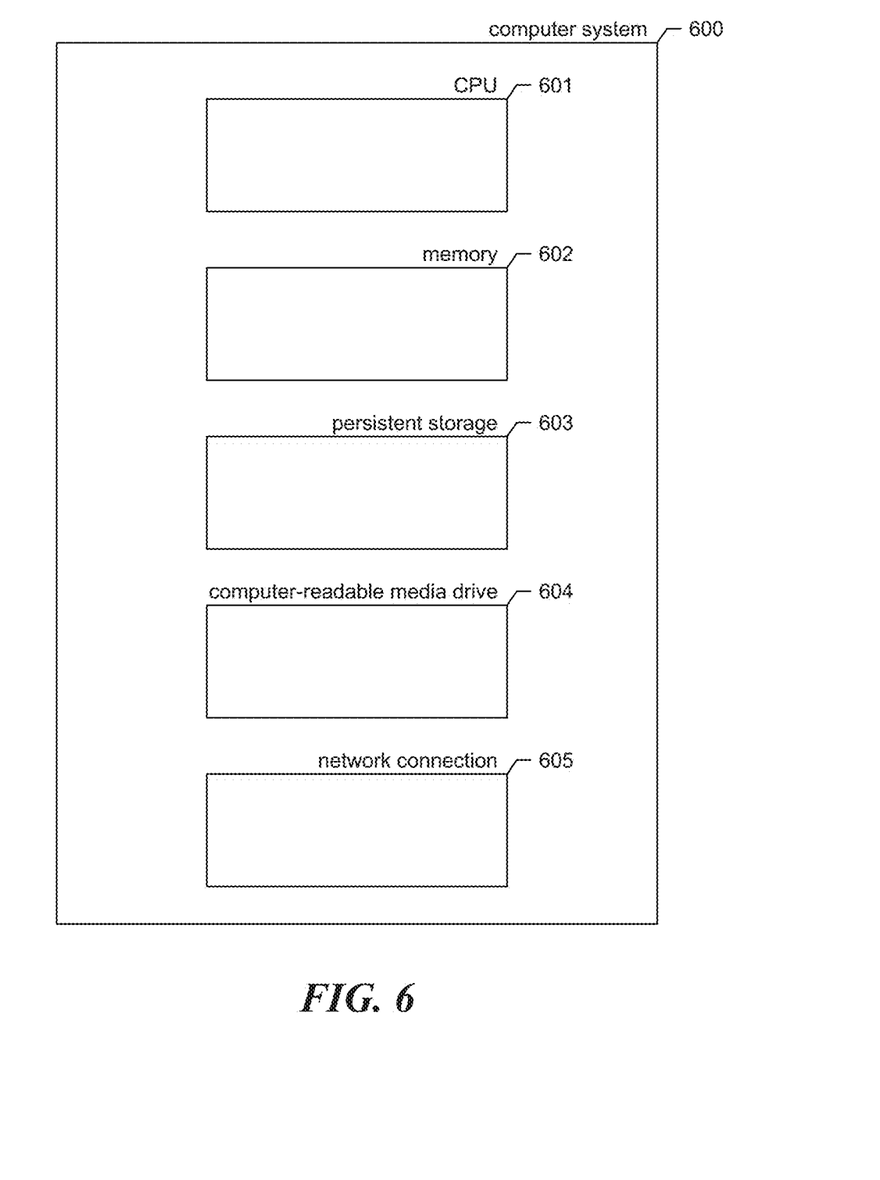
FIG. 6 is a block diagram illustrating some of the components that may be incorporated in at least some of the computer systems and other devices on which the system operates and interacts with in accordance with some examples of the disclosed technology.

FIG. 6 is a block diagram illustrating some of the components that may be incorporated in at least some of the computer systems and other devices on which the system operates and interacts with in some examples. In various examples, these computer systems and other devices 600 can include server computer systems, desktop computer systems, laptop computer systems, netbooks, tablets, mobile phones, personal digital assistants, televisions, cameras, automobile computers, electronic media players, and/or the like. In various examples, the computer systems and devices include one or more of each of the following: a central processing unit (CPU) 601 configured to execute computer programs; a computer memory 602 configured to store programs and data while they are being used, including a multithreaded program being tested, a debugger, an operating system including a kernel, and device drivers; a persistent storage device 603, such as a hard drive or flash drive configured to persistently store programs and data; a computer-readable storage media drive 604, such as a floppy, flash, CD-ROM, or DVD drive, configured to read programs and data stored on a computer-readable storage medium, such as a floppy disk, flash memory device, a CD-ROM, or a DVD; and a network connection 605 configured to connect the computer system to other computer systems to send and/or receive data, such as via the Internet, a local area network, a wide area network, a point-to-point dial-up connection, a cell phone network, or another network and its networking hardware in various examples including routers, switches, and various types of transmitters, receivers, or computer-readable transmission media. While computer systems configured as described above may be used to support the operation of the disclosed techniques, those skilled in the art will readily appreciate that the disclosed techniques may be implemented using devices of various types and configurations, and having various components. Elements of the disclosed systems and methods may be described in the general context of computer-executable instructions, such as program modules, executed by one or more computers or other devices. Generally, program modules include routines, programs, objects, components, data structures, and/or the like configured to perform particular tasks or implement particular abstract data types and may be encrypted. Moreover, the functionality of the program modules may be combined or distributed as desired in various examples. Moreover, display pages may be implemented in any of various ways, such as in C++ or as web pages in XML (Extensible Markup Language), HTML (HyperText Markup Language), JavaScript, AJAX (Asynchronous JavaScript and XML) techniques or any other scripts or methods of creating displayable data, such as the Wireless Access Protocol (WAP).

The following discussion provides a brief, general description of a suitable computing environment in which the invention can be implemented. Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable storage media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a computer-readable propagation medium or a computer-readable transmission medium (e.g., electromagnetic wave(s), a sound wave, etc.) over a period of time, or they may be provided on any analog or digital network (packet switched, circuit switched, or other scheme). Non-transitory computer-readable media include tangible media such as hard drives, CD-ROMs, DVD-ROMS, and memories such as ROM, RAM, and Compact Flash memories that can store instructions and other computer-readable storage media. Transitory computer-readable media include signals on a carrier wave such as an optical or electrical carrier wave and do not include hardware devices.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. For example, while several of the examples provided above are described in the context of slides and slide decks, one of ordinary skill in the art will recognize that these techniques can be applied to other types of documents and individual pages or units thereof, such as word processing documents, web pages, spreadsheets, images, and so on. Details of the system may vary considerably in the specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. For example, although examples described herein relate specifically to slides and slide decks, one of ordinary skill in the art will recognize that the disclosed techniques can be applied to other types of content, such as pages and word processing documents, cells and spreadsheets, records and databases, and so on.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims. Accordingly, the invention is not limited except as by the appended claims.

We claim:

1. A method, performed by a computing system having a memory and a processor, the method comprising:
   receiving an indication of a plurality of content items;
   for each of the plurality of content items,
      identifying at least one content element of the content item, and
      for each identified content element of the content item,
         extracting information for the content element,
         computing a plurality of semantic feature values for the content element based at least in part on the extracted information,
         computing a plurality of visual feature values for the content element based at least in part on the extracted information, and
         storing the feature values computed, for the content element, based at least in part on the extracted information;
   receiving an indication of a first set of content items, wherein each content item of the first set of content items is a member of the plurality of content items;
   for each pair of content items from among the first set of content items,
      applying a similarity function to the pair of content items to generate a similarity value, and
      storing, in association with each content item of the pair of content items, the generated similarity value;
   for each content item of the first set of content items,
      identifying similar content items based at least in part on the generated similarity values, and
      storing, in association with the content item, references to at least one of the identified similar content items.

2. The method of claim 1, wherein the received indication of the first set of content items comprises a link to at least one content item of the first set of content items.

3. The method of claim 1, wherein computing a plurality of semantic feature values for the content element based at least in part on the extracted information comprises applying a latent semantic analysis engine to at least a portion of text extracted from the content element.

4. The method of claim 1, wherein extracting information for the content element comprises generating a thumbnail image for the content element.

5. The method of claim 1, wherein identifying the set of similar content items for a first content item based at least in part on the generated similarity values comprises identifying a predetermined number of similar content items.

6. The method of claim 1, wherein identifying the set of similar content items for a first content item based at least in part on the generated similarity values comprises:
   for each content item pair that includes the first content item and a content item other than the first content item,
      retrieving the similarity value generated for the content item pair.

7. The method of claim 6, further comprising:
   for each retrieved similarity value for the content item pairs that include the first content item and a content item other than the first content item,
      determining whether the retrieved similarity value exceeds a predetermined threshold, and
      in response to determining that the retrieved similarity value exceeds a predetermined threshold,
         identifying the content item other than the first content item.

8. The method of claim 1, further comprising:
   splitting a first content item of the plurality of content items into a plurality of content elements.

9. The method of claim 8, wherein the first content item is a slide presentation deck wherein splitting the first content item of the plurality of content items into a plurality of content elements comprises splitting the slide presentation deck into a plurality of slides, wherein a second content item is a word processing document, the method further comprising splitting the word processing document into a plurality of pages.

10. The method of claim 1, further comprising:
    clustering the first set of content items based at least in part on the generated similarity values.

11. The method of claim 1, wherein applying a similarity function to a first pair of content items to generate a similarity value comprises:

for a first content item of the first pair of content items, determining a value for each of a plurality of attributes;
for a second content item of the first pair of content items, determining a value for each of a plurality of attributes;
calculating a distance between the first content item of the first pair of content items and the second content item of the first pair of content items according to the following equation $$\sqrt{\sum_{i=0}^{n} (A_i - B_i)^2}$$

where $A_i$ represents the $i^{th}$ attribute value of the plurality of attributes for the first content item of the first pair of content items, $B_1$ represents the $i^{th}$ attribute value for the second content item of the first pair of content items, and n represents a number of the plurality of attributes.

12. The method of claim 1, further comprising:
for each of a plurality of metrics,
for each content item of a first set of similar content items, retrieving, for the content item, a value for the metric, and
aggregating the values retrieved for the metric.

13. A system for analyzing content items, the system comprising:
at least one processor;
a component configured to receive an indication of a plurality of content items;
a component configured to, for each of the plurality of content items,
identify at least one content element of the content item, and
for each identified content element of the content item,
extract information for the content element,
compute a plurality of semantic feature values for the content element based at least in part on the extracted information,
compute a plurality of visual feature values for the content element based at least in part on the extracted information, and
store the feature values computed, for the content element, based at least in part on the extracted information;
a component configured to receive an indication of a first set of content items, wherein each content item of the first set of content items is a member of the plurality of content items;
a component configured to, for each pair of content items from among the first set of content items,
apply a similarity function to the pair of content items to generate a similarity value for the pair of content items, and
store, in association with each content item of the pair of content items, the generated similarity value; and
a component configured to, for each content item of the first set of content items,
identify a set of similar content items based at least in part on the generated similarity values, and
store, in association with the content item, references to at least one content item of the identified set of similar content items,
wherein each of the components comprises computer-executable instructions stored in a memory for execution by the at least one processor.

14. The system of claim 13, further comprising:
a component configured to store, in association with each content item of a first pair of content items, the similarity value generated for the first pair of content items in each of first metadata associated with a first content item of the first pair of content items and second metadata associated with a second content item of the first pair of content items.

15. The system of claim 13, further comprising:
a component configured to, for each content item of a first set of similar content items identified for a first content item, store an indication of the content item of the first set of similar content items in a lookup table, wherein the indication is referenced in the lookup table by an indication of the first content item.

16. The system of claim 13, wherein the component configured to receive an indication of a first set of content items receives a copy of at least one content item of the first set of content items.

17. The system of claim 13, further comprising:
means for ingesting content; and
means for assessing similarity of content items.

18. A computer-readable storage medium, that is not a transitory, propagating signal, storing instructions that, when executed by a computing system having a processor, cause the computing system to perform a method comprising:
receiving an indication of a plurality of content items; and
for each of the plurality of content items,
identifying at least one content element of the content item, and
for each identified content element of the content item,
extracting information for the content element,
computing a plurality of feature values for the content element based at least in part on the extracted information,
wherein computing the plurality of feature values for the content element based at least in part on the extracted information comprises computing a plurality of visual feature values for the content element based at least in part on the extracted information, and
wherein computing the plurality of feature values for the content element based at least in part on the of semantic feature values for the content element based at least in part on the extracted information, and
storing the feature values computed for the content element based at least in part on the extracted information; and
receiving an indication of a first set of content items, wherein each content item of the first set of content items is a member of the plurality of content items;
for each pair of content items from among the first set of content items,
applying a similarity function to the pair of content items to generate a similarity value, and
storing, in association with each content item of the pair of content items, the generated similarity value;
for each content item of the first set of content items,
identifying similar content items based at least in part on the generated similarity values, and
storing, in association with the content item references to at least one of the identified similar content items.

19. The computer-readable storage medium, that is not a transitory, propagating signal, of claim 18, the method further comprising:

generating a weight value for a first computed visual feature value; and applying the generated weight value to the first computed visual feature value.

20. The computer-readable storage medium, that is not a transitory, propagating signal, of claim 18, the method further comprising:

generating a weight value for a first computed semantic feature value; and applying the generated weight value to the first computed semantic feature value.

21. The system of claim 13, further comprising:

a component configured to split a first content item of the plurality of content items into a plurality of content elements.

22. The system of claim 13, further comprising:

a component configured to cluster the first set of content items based at least in part on the generated similarity values.

23. The system of claim 13, further comprising:

a component configured to, for each of a plurality of metrics, for each content item of a first set of similar content items, retrieve, for the content item, a value for the metric, and aggregate the values retrieved for the metric.

* * * * *

UNITED STATES PATENT AND TRADEMARK OFFICE
CERTIFICATE OF CORRECTION

PATENT NO. : 9,984,310 B2
APPLICATION NO. : 15/004693
DATED : May 29, 2018
INVENTOR(S) : Raphael Hoffman et al.

It is certified that error appears in the above-identified patent and that said Letters Patent is hereby corrected as shown below:

In Column 15, Line 17, in Claim 11, delete "B1" and insert -- Bi --, therefor.

In Column 16, Line 45, in Claim 18, after "the" insert -- extracted information comprises computing a plurality --.

In Column 16, Line 63, in Claim 18, delete "item" and insert -- item, --, therefor.

Signed and Sealed this
Twenty-fifth Day of September, 2018

Andrei Iancu
*Director of the United States Patent and Trademark Office*